(12) United States Patent
Yamamoto et al.

(10) Patent No.: US 7,568,448 B2
(45) Date of Patent: Aug. 4, 2009

(54) PET TOILET

(75) Inventors: Jun Yamamoto, Tokyo (JP); Hiroyuki Yamada, Tokyo (JP)

(73) Assignee: Kao Corporation, Tokyo (JP)

( * ) Notice: Subject to any disclaimer, the term of this patent is extended or adjusted under 35 U.S.C. 154(b) by 39 days.

(21) Appl. No.: 11/661,788

(22) PCT Filed: Aug. 31, 2005

(86) PCT No.: PCT/JP2005/015879

§ 371 (c)(1),
(2), (4) Date: Jun. 1, 2007

(87) PCT Pub. No.: WO2006/025435

PCT Pub. Date: Mar. 9, 2006

(65) Prior Publication Data

US 2008/0035069 A1    Feb. 14, 2008

(30) Foreign Application Priority Data

Sep. 2, 2004   (JP) ............................. 2004-256242
Oct. 18, 2004  (JP) ............................. 2004-303469

(51) Int. Cl.
    *A01K 1/01* (2006.01)
(52) U.S. Cl. ...................................... 119/166
(58) Field of Classification Search ................ 119/166, 119/165, 167, 170, 161, 479
    See application file for complete search history.

(56) References Cited

U.S. PATENT DOCUMENTS

| | | | | |
|---|---|---|---|---|
| 3,827,401 | A * | 8/1974 | Franzl | 119/169 |
| 5,193,488 | A * | 3/1993 | Walton | 119/166 |
| 6,138,609 | A * | 10/2000 | Gordon | 119/166 |
| 6,439,160 | B1 * | 8/2002 | Wheelwright | 119/165 |
| 6,578,520 | B2 | 6/2003 | Otsuji et al. | |
| 6,802,281 | B2 * | 10/2004 | Otsuji et al. | 119/169 |
| 6,837,179 | B2 * | 1/2005 | Sannikka | 119/165 |
| 6,994,054 | B2 * | 2/2006 | Matsuo et al. | 119/166 |
| 7,131,396 | B2 * | 11/2006 | Matsuo et al. | 119/166 |
| 7,380,519 | B2 * | 6/2008 | Ikegami et al. | 119/167 |
| 2003/0116095 | A1 | 6/2003 | Otsuji | |

(Continued)

FOREIGN PATENT DOCUMENTS

EP    1 488 691 A2    12/2004

(Continued)

*Primary Examiner*—Yvonne R. Abbott
(74) *Attorney, Agent, or Firm*—Birch, Stewart, Kolasch & Birch, LLP (57) ABSTRACT

A pet toilet 10 having a toilet box 13, a drainboard 14 partitioning the toilet box into an upper compartment and a lower compartment, an excreta treating material 15 laid in the upper compartment, and an urine absorbent member 11 laid in the lower compartment. The drainboard is an integral structure formed of a plurality of longitudinally extending ribs 17 spaced parallel with each other and a plurality of transversely extending ribs 18a and 18b intersecting the longitudinally extending ribs 17 and spaced parallel with each other to have drain holes 12. Each drain hole 12 has a longitudinal dimension S2 at least twice its transverse dimension S1. The transversely extending ribs include ribs 18a with a smaller height H1 from the drainboard surface 14a downward and ribs 18b with a larger height H2 from the drainboard surface 14a downward, the ribs 18a and the ribs 18b alternating with each other.

9 Claims, 5 Drawing Sheets

U.S. PATENT DOCUMENTS

2004/0261727 A1   12/2004   Matsuo et al.

FOREIGN PATENT DOCUMENTS

| JP | 61-22461 A | 2/1986 |
| JP | 7-67489 A | 3/1996 |
| JP | 3026730 U | 7/1996 |
| JP | 10-229768 A | 9/1998 |
| JP | 2001-224271 A | 8/2001 |
| JP | 2003-180152 A | 7/2003 |
| JP | 2005-6605 A | 1/2005 |

* cited by examiner

PET TOILET

TECHNICAL FIELD

The present invention relates to a pet toilet and more particularly a pet toilet having a toilet box partitioned by a drainboard into an upper compartment and a lower compartment, with a waste treating material laid in the upper compartment and an urine absorbent member laid in the lower compartment.

BACKGROUND ART

Known pet toilets for treating the excreta of pets such as cats and dogs include those disclosed in JP 7-67489A and JP 2003-180182A, in which a toilet box is partitioned into upper and lower compartments by a porous member (drainboard), with an excreta treating material put in the upper compartment and a urine absorbent member is made of an absorbent polymer, plant fiber, pulp, etc. set in the lower compartment.

According to these pet toilet systems, liquid waste discharged by a pet is allowed to quickly pass the excreta treating material placed in the upper compartment, drop through the drain holes of the drainboard, and be positively absorbed by an urine absorbent member, such as a urine absorbing mat, laid in the lower compartment of the toilet box. The urine absorbent member having absorbed urine must be replaced periodically. For the purpose of facilitating the replacement, JP Utility Model 61-22461A discloses a system in which the lower compartment of the toilet box where the urine absorbent member is placed is designed to be pulled out like a drawer.

DISCLOSURE OF THE INVENTION

The present invention provides a pet toilet having a toilet box, a drainboard partitioning the toilet box into an upper compartment and a lower compartment, an excreta treating material laid in the upper compartment, and an urine absorbent member laid in the lower compartment. The drainboard is integrally constructed of a plurality of longitudinally extending ribs spaced parallel with each other and a plurality of transversely extending ribs intersecting the longitudinally extending ribs and spaced parallel with each other to have drain holes. Each drain hole has a longitudinal dimension at least twice the transverse dimension thereof. The height of the transversely extending rib measured from the upper surface of the drainboard downward is different from that of at least one of adjacent transversely extending ribs.

The present invention also provides a pet toilet having a toilet box, a drainboard partitioning the toilet box into an upper compartment and a lower compartment, an excreta treating material laid in the upper compartment, and an urine absorbent member laid in the lower compartment. The drainboard is integrally constructed of a plurality of longitudinally extending ribs spaced parallel with each other and a plurality of transversely extending ribs intersecting the longitudinally extending ribs and spaced parallel with each other to have drain holes. Each drain hole has a longitudinal dimension at least twice the transverse dimension thereof. The height of the rib with the least height of all the ribs measured from the surface of the drainboard downward is at least 0.8 times the transverse dimension of the drain hole.

The present invention also provides a pet toilet having a toilet box, a drainboard partitioning the toilet box into an upper compartment and a lower compartment, an excreta treating material laid in the upper compartment, and an urine absorbent member laid in the lower compartment. The lower compartment containing the urine absorbent member has a drawer slidably removable in one direction from the lower compartment. The drainboard is integrally constructed of a plurality of longitudinally extending ribs extending in a direction making an angle within 45° with the sliding direction of the drawer and spaced parallel with each other and a plurality of transversely extending ribs intersecting the longitudinally extending ribs and spaced parallel with each other. The height of the longitudinally extending rib with the largest height of all the longitudinally extending ribs measured from the surface of the drainboard downward is larger than the height of any transversely extending rib disposed within an area where the drawer is movable.

BEST MODE FOR CARRYING OUT THE INVENTION

The drainboard is a porous member having a large number of drain holes which is an integral structure formed of a plurality of longitudinally extending ribs spaced parallel to each other and a plurality of transversely extending ribs spaced parallel to each other and intersecting the longitudinally extending ribs. It is desired that the drainboard make liquid waste having passed through the excreta treating material drop into the lower compartment without allowing the liquid to stay thereon so that the liquid may effectively be prevented from being absorbed by the excreta treating material or from staying on the drainboard to generate an offensive odor. That is, it is desirable that the drainboard be designed to effectively prevent urine having passed through the excreta treating material from staying thereon while forming a film of liquid bridging over the drain hole or attaching to the lower side of the ribs.

The present inventors have found the following specific design of the drainboard effective to avoid liquid waste from forming a liquid bridge over the drain hole or attaching to the lower side of the ribs and thereby staying there. The specific design of the drainboard is that the drain holes defined by the longitudinally extending ribs and the transversely extending ribs are longer in their longitudinal direction than in their width direction, and preferably have a longitudinal dimension at least twice the transverse dimension thereof. The inventors have also found it preferred that the above design be combined with an additional feature that the height of the transversely extending rib measured from the upper surface of the drainboard downward is different from that of at least one of adjacent transversely extending ribs and/or another additional feature that the height of the rib with the least height of all the ribs measured from the surface of the drainboard downward is at least 0.8 times the transverse dimension of the drain hole.

The drainboard is generally made of resin or metal. The drainboard tends to show plastic sagging due to the weight of the excreta treating material put thereon and the body weight of a pet, depending on the thickness and width of the ribs. If sagging occurs in the case where the lower compartment of the toilet box has a one-drawer structure, the irregularity on the lower side of the drainboard tends to interfere with the sliding movement of the top of the back wall of the tray, making it difficult to pull out the drawer and causing problems in changing urea absorbent members.

To avoid such interference with the drawer's movement, if a sufficient clearance is provided between the lower side of the drainboard and the top of the back wall of the drawer, the upper surface level of the drainboard should be so raised. As a result, the toilet box will have an accordingly increased wall height, which makes the toilet less easy for a pet to enter. Hence, it is desired to effectively avoid the interference of the sag of the drainboard with the back wall of the drawer while minimizing the clearance between the lower side of the drainboard and the top of the back wall of the drawer thereby to maintain the height of the pet toilet. Then, the drawer will be pulled in and out smoothly to achieve efficient replacement of the urine absorbent member with a new one.

In a pet toilet system having a drainboard fabricated by the intersection between longitudinally extending ribs and transversely extending ribs and a drawer-like lower compartment containing a urine absorbent member below the drainboard, the present inventors have found that the following specific drainboard design is effective to prevent interference of the sagged drainboard with the top of the back wall of the drawer thereby allowing one to pull the drawer in and out smoothly and to replace the urine absorbent member easily. That is, the drainboard is designed to be an integral structure constructed of a plurality of longitudinally extending ribs spaced parallel with each other and extending in a direction making an angle within 45° with the moving direction of the drawer and a plurality of transversely extending ribs spaced parallel with each other and intersecting with the longitudinally extending ribs. The drainboard is also designed such that the height of the longitudinally extending rib with the largest height of all the longitudinally extending ribs measured from the surface of the drainboard downward is larger than the height of any transversely extending ribs disposed within an area where the drawer is movable.

Figure 1:
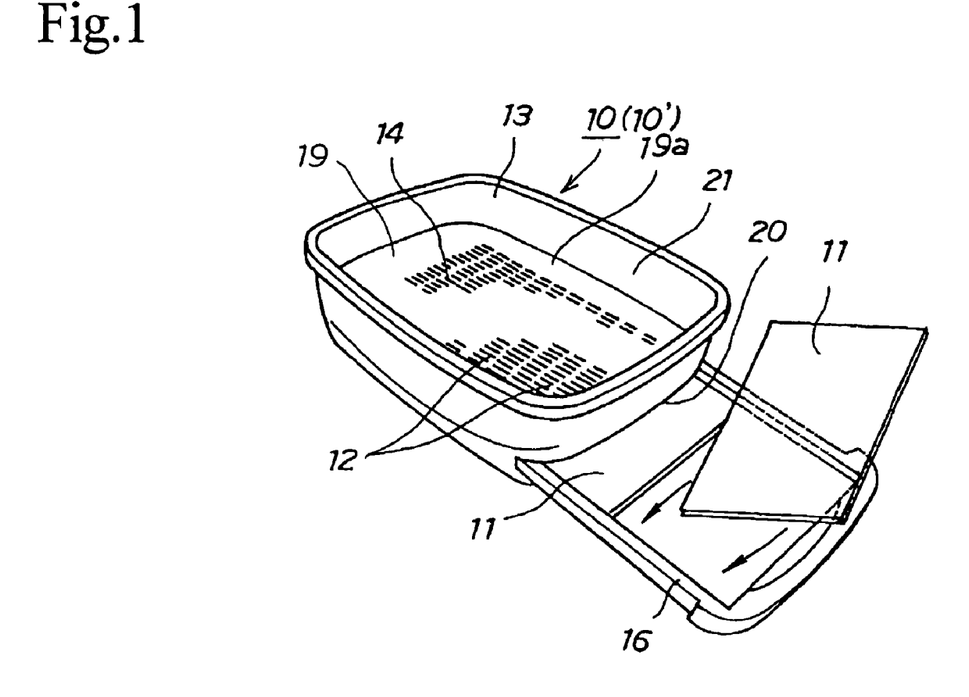
FIG. 1 is a perspective of a pet toilet according to an embodiment of the present invention, showing the way of setting a urine absorbent member before scattering an excreta treating material.
Figure 2:
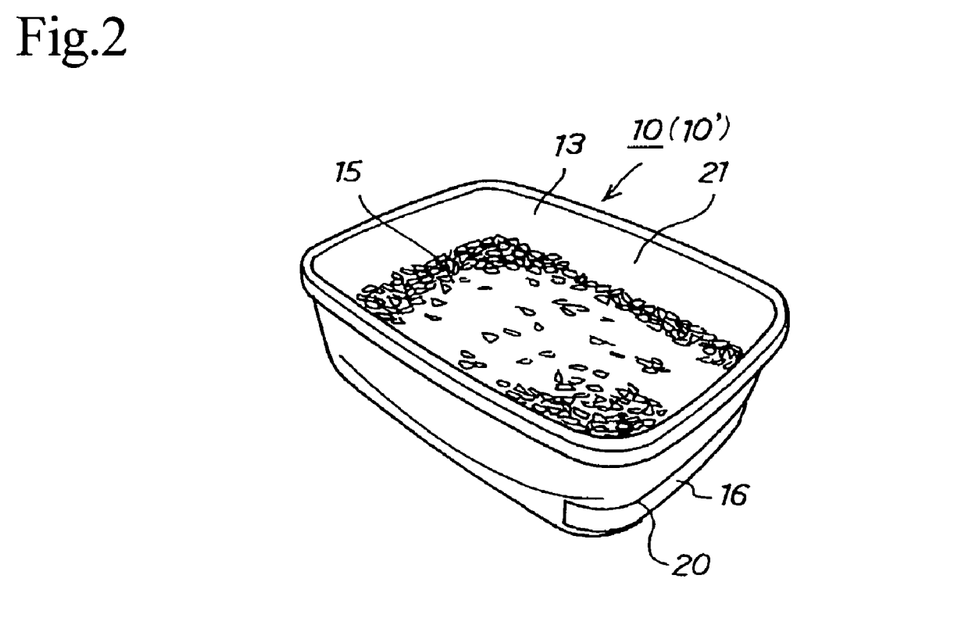
FIG. 2 is a perspective of a pet toilet according to an embodiment of the present invention.

As illustrated in FIGS. 1 and 2, a pet toilet 10 according to a preferred embodiment of the present invention has an almost rectangular open-top toilet box 13, a drainboard 14 as a porous member partitioning the toilet box 13 into an upper compartment and a lower compartment, and an almost rectangular, shallow tray 16 removably fitted under the drainboard 14. The upper compartment provides a litter housing 21 above the drainboard 14, in which an excreta treating material 15 in the form of numerous pellets is put and laid. An absorbent mat 11 as a urine absorbent member is removably disposed in the tray 16. The absorbent mat 11 is adapted to absorb urine dropping from the litter housing 21 through the drain holes 12 of the drainboard 14.

Figure 3:
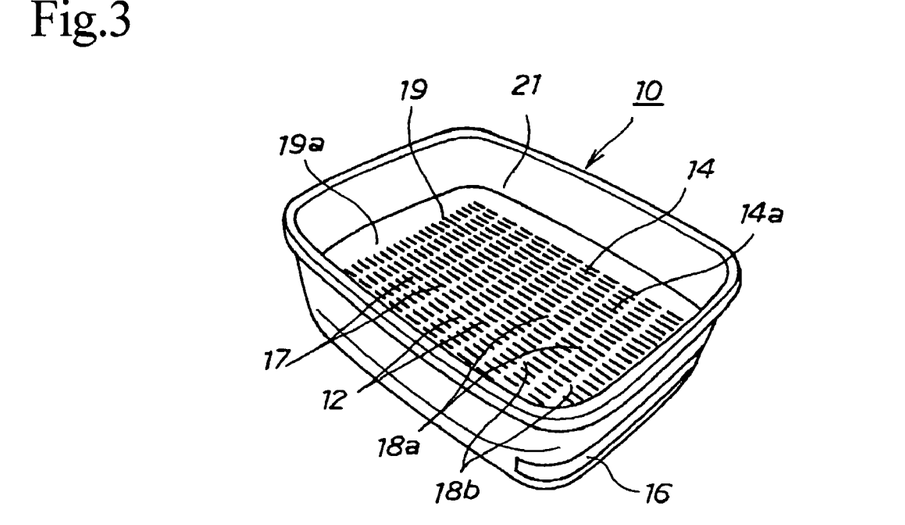
FIG. 3 is a perspective of a pet toilet according to an embodiment of the present invention, showing the state before scattering an excreta treating member.
Figures 4A, 4B:
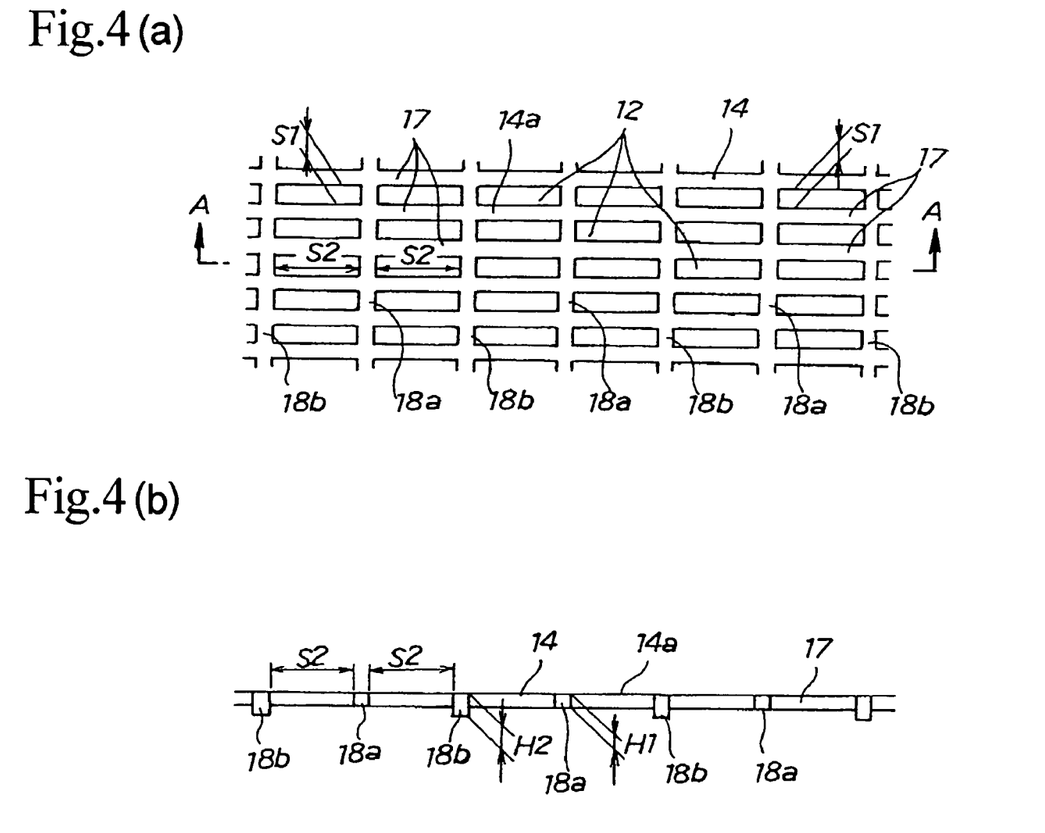
FIG. 4(a) is an enlarged, fragmentary plan of a drainboard of a pet toilet according to an embodiment of the present invention.
FIG. 4(b) is a cross-section taken along line A-A in FIG. 4(a).

As described, the pet toilet 10 of the present embodiment has the toilet box 13 partitioned by the drainboard 14 into an upper compartment and a lower compartment, with the excreta treating material 15 in the litter housing 21 of the upper compartment, and the absorbent mat 11 in the tray 16 fitted into the lower compartment. As illustrated in FIGS. 3, 4(a), and 4(b), the drainboard 14 is an integral structure constructed of a plurality of longitudinally extending ribs 17 substantially equally spaced parallel with each other and a plurality of transversely extending ribs 18a and 18b substantially equally spaced parallel with each other. The longitudinally extending ribs 17 and the transversely extending ribs 18a and 18b intersect with each other to define drain holes 12. The longitudinal dimension of each drain hole 12 is at least twice (10 times in this particular example illustrated) its transverse dimension. The height of the transversely extending ribs 18a, 18b measured from the upper surface 14a of the drainboard 14 downward is different from that of at least one of adjacent transversely extending ribs 18a, 18b (in the present example illustrated, transversely extending ribs 18a with a height H1 measured from the surface 14a downward and transversely extending ribs 18b with a height H2 measured from the surface 14a downward alternate with each other; the height H1 being smaller than the height H2, the transversely extending ribs 18a and 18b will hereinafter be referred to as transversely extending, first ribs 18a and transversely extending, second ribs 18b, respectively). The term "longitudinal" or "longitudinally" as used herein means "of or relating to the direction coinciding with the longer side or a major axis of the drain hole 12 of the drainboard 14". The term "transverse" or "transversely" as used herein means "of or relating to the direction coinciding with the shorter side or a minor axis of the drain hole 12 of the drainboard 14".

The above-described drainboard design in the present embodiment, in which the height of the transversely extending ribs 18a, 18b measured from the upper surface 14a of the drainboard 14 downward is different from that of at least one of adjacent transversely extending ribs 18a, 18b, may be replaced with a drainboard design in which the height H of the rib with the least height of all the ribs 17, 18a, and 18b measured from the drainboard surface downward is at least 0.8 times the transverse dimension S1 of the drain hole 12 for the following reason. A film of liquid (urine) bridging across a drain hole 12, a so-called liquid bridge, is formed on the lower side of any of the ribs 17, 18a, and 18b that has the least height from the drainboard surface 14a downward. The excreta treating material 15 put on the drainboard 14 must not drop through the drain holes 12. A spherical excreta treating material 15, for example, must have a diameter larger than the transverse dimension of the drain hole 12. Accordingly, when the height of the rib with the least height of all the ribs 17, 18a, and 18b fabricating the drainboard 14 as measured from the drainboard surface 14a downward is at least 0.8 times the transverse dimension S1 of the drain hole 12, the excreta treating material hardly comes into contact with the liquid bridge and hardly absorbs urine.

In order to prevent urine from remaining on the drainboard 14 and to avoid the excreta treating material absorbing urine, it is preferred not only that the height of the transversely extending ribs 18a, 18b measured from the upper surface 14a of the drainboard 14 downward be different from that of at least one of adjacent transversely extending ribs 18a, 18b, but also that the height of the rib with the least height of all the ribs 17, 18a, and 18b measured from the drainboard surface 14a downward be at least 0.8 times the transverse dimension S1 of the drain hole 12.

In the present embodiment, it is preferred that the transverse dimension S1 of the drain hole 12 of the drainboard 14 be in the range of from 2 to 8 mm (3 mm in the example illustrated).

The toilet box 13 is a molded article of a synthetic resin such as polyethylene (PE), polypropylene (PP), an acrylonitrile-butadiene-styrene copolymer (ABS). As in the example shown in FIGS. 1 and 2, the toilet box 13 may have an almost rounded-rectangular plan measuring, e.g., 200 to 800 mm in length and 150 to 500 mm in width and have a height, e.g., of 100 to 200 mm. The toilet box 13 is partitioned into an upper compartment and a lower compartment by a perforated partition 19 that is integrally molded with the toilet box 13. The upper space measuring about 40 to 200 mm high from the drainboard provides an open-top litter housing 21, while the lower space measuring about 0 to 40 mm deep from the drainboard provides a tray housing 20 in which a tray 16 is removably fitted.

In the present embodiment, a pelletized, excreta treating material 15 is put in the litter housing 21 constituting the upper compartment of the toilet box 13. The excreta treating material 15 preferably has a water repellent function. For example, molded products containing a ground material of plant origin and a synthetic resin can be used. These molded products are poorly water absorbent, preferably having a water absorption rate of 1% to 10%, more preferably 1% to 5%. They allow discharged pet's urine to swiftly pass therethrough, drop into the lower compartment through the drain holes 12 of the drainboard 14, and be positively absorbed by an absorbent mat 11 disposed in the tray 16 housed in the lower compartment.

The term "absorption rate" as used herein denotes a weight increase rate of a sample when soaked in water at 25° C. for 3 seconds, being represented by the formula: (Weight of sample after soaking−weight of sample before soaking)/(weight of sample before soaking)×100 (%)

In the present embodiment, the tray 16 is removably fitted into the tray housing 20 in the lower compartment of the toilet box 13. The absorbent mat 11, which is a urine absorbent member, is replaceably disposed in the tray 16 and thus set in the lower compartment of the toilet box 13. The absorbent mat 11 can be a plate molded from a molding material containing, e.g., plant fiber or pulp or a clay mineral material. The absorbent mat 11 has a thickness, e.g., of 2 to 20 mm and excellent water absorptivity as represented by, for example, a saturated water absorption of 2 g/1 g or more. The absorbent mat 11 is thus adapted to efficiently absorb urine having dropped from the upper compartment of the toilet box 13.

The saturated water absorption is measured as follows.

<Method of Measuring Saturated Water Absorption>

Figure 5:
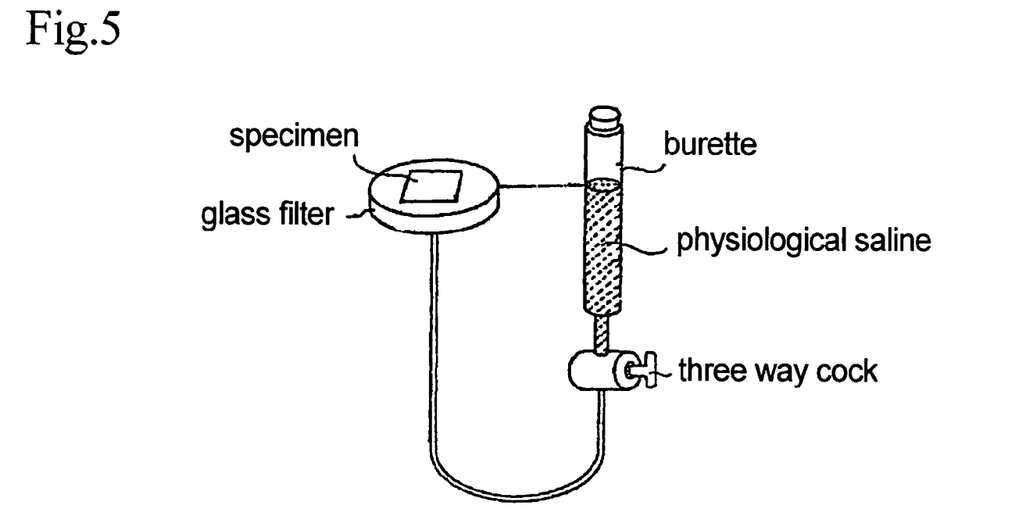
FIG. 5 schematically illustrates a method of measuring the saturated water absorption of an urine absorbent member.

A demand wettability tester shown in FIG. 5, which is well known as an apparatus for carrying out a demand wettability test, is used. A 60 mm wide and 60 mm long specimen is cut out of an urine treating molding product with the thickness as molded, dried in a dryer set at 105° C. for 1 hour, and then allowed to cool to room temperature in a desiccator. As illustrated in FIG. 5, the thus conditioned specimen is put on the glass filter set on the same level with the liquid level of physiological saline in the burette. The three-way cock is opened to let the specimen absorb physiological saline. When bubbling stops, the absorbing amount is measured by reading the scale of the burette which indicates the reduction of the liquid level of physiological saline, and the amount is divided by the weight of the specimen to obtain the amount of a saturated water absorption (g/g) (an average of three specimens (n=3)). The measurement is made once on each one of three specimens.

In the present embodiment, as illustrated in FIG. 3, the drainboard 14 constitutes the main part of the partition 19, which is integral with the toilet box 13, except the peripheral portion 19a. As illustrated in FIGS. 4(a) and 4(b), the drainboard 14 is integrally formed of longitudinally extending ribs 17 parallel to each other with a spacing S1, e.g., of 3 mm and transversely extending ribs 18a and 18b parallel to each other with a spacing S2, e.g., of 30 mm. The longitudinally extending ribs and the transversely extending ribs intersect with each other at right angles. Thus, the drainboard 14 has a great number of rectangular drain holes 12 regularly arranged in a grid all over its area. The drain holes 12 have a transverse dimension S1 of 3 mm and a lengthwise dimension S2 of 30 mm.

In the present embodiment, each longitudinally extending rib 17 has a rectangular cross-section with, for example, a width of 2 to 10 mm and a height of 2 to 10 mm. Each transversely extending, first rib 18a has a rectangular cross-section with, for example, a width of 2 to 10 mm and a height of 2 to 10 mm. Each transversely extending, second rib 18b has a rectangular cross-section with, for example, a width of 2 to 10 mm and a height of 2.5 to 10.5 mm. All the longitudinally extending ribs 17 and the transversely extending ribs 18a and 18b are even on their upper surface to make the upper surface 14a of the drainboard 14. Accordingly, the transversely extending, first ribs 18a and the transversely extending, second ribs 18b protrude downward with a smaller height H1 and a larger height H2, respectively, from the surface 14a of the drainboard 14.

The drainboard 14 is preferably made of a synthetic resin, such as polyethylene (PE), polypropylene (PP) or an acrylonitrile-butadiene-styrene copolymer (ABS).

According to the present invention, each drain hole 12 of the drainboard 14 formed of the ribs 18a, 18b, 17 should have a dimension in the longitudinal direction at least twice as large as that in the transverse direction. The dimension in the longitudinal direction is preferably 3 to 15 times, more preferably 4 to 10 times, that in the transverse direction. As long as the longitudinal dimension is twice or more the transverse dimension, a liquid bridge of urine is drawn in the longitudinal direction by capillarity and broken easily, leaving no urine on the drainboard 14.

The transverse dimension S1 of the drain hole 12 is preferably 2 to 8 mm, more preferably 3 to 5 mm. Within that range, the capillary force drawing the liquid bridge in the longitudinal direction is strong to ensure an easy break of the liquid bridge, leaving no urine on the drainboard 14.

The difference between the height H1 of the transversely extending, first ribs 18a and the height H2 of the transversely extending, second ribs 18b is preferably 0.5 to 6 mm, more preferably 2 to 4 mm. When the difference between the height H1 of the transversely extending, first ribs 18a and the height H2 of the transversely extending, second ribs 18b is 0.5 to 6 mm, a liquid bridge formed over the drain hole 12 will be destabilized by the difference in level between the opposing ends thereof and broken easily. Furthermore, the liquid (urine) of the broken liquid bridge will easily gather to the transversely extending, second rib 18b.

The above-described constitution of the present embodiment produces the following effect in the pet toilet 10 having the toilet box 13 partitioned by the drainboard 14 into an upper compartment and a lower compartment, the excreta treating material 15 laid in the upper compartment, and the absorbent mat 11 laid in the lower compartment, the drainboard 14 having a large number of oblong drain holes 12 formed by the intersection of longitudinally extending ribs 17 and transversely extending ribs 18a and 18b. Urine is prevented from forming a liquid bridge across the drain hole or attaching the lower surface of the ribs 17, 18a and 18b. That is, remaining of urine having passed through the excreta treating material 15 on the drainboard 14 is avoided effectively.

More specifically, according to the present embodiment, the drain holes 12 of the drainboard 14 have a longitudinal dimension at least twice as large as the transverse dimension. In addition, the transversely extending, first ribs 18a with a smaller height from the drainboard surface 14a downward and the transversely extending, second ribs 18b with a larger height from the drainboard surface 14a are alternately arranged. This configuration makes a difference in level between the opposite ends of a liquid bridge formed across a drain hole 12, which destabilizes the balance of the liquid bridge. As a result, the liquid bridge formed over the oblong drain hole 12 breaks easily and rapidly. At the same time, urine attaching to the lower surface of the ribs 17, 18a, and 18b is made to gather on the lower surface of the transversely extending, second ribs 18b with a larger downward height and then dropped smoothly. Thus, it is possible to effectively avoid the excreta treating material 15 from absorbing the urine remaining on the drainboard 14 and to prevent the remaining urine from generating odor.

The present invention is not limited to the foregoing embodiment, and various changes and modifications can be made therein. The intersection between the longitudinally extending, parallel ribs 17 and the transversely extending, parallel ribs 18 does not need to be at right angles. That is, the drainboard may be formed by intersecting the ribs at angles deviating from 90°. It is only necessary that the height of the transversely extending rib measured from the upper surface of the drainboard downward be different from that of at least one of adjacent transversely extending ribs (one or two ribs out of adjacent three is/are higher than the other(s)). All the transversely extending ribs do not always have two different heights and may have three or more different heights. Each drain hole does not need to be an oblong rectangle and may have any oblong shape such as an elongated circle. In the case of an elongated circle, the major axis of the drain hole should be at least twice the minor axis. The longitudinal direction of the drain hole does not need to coincide with the longitudinal direction of the toilet box and may be a direction oblique or orthogonal to the longitudinal direction of the toilet box. The urine absorbent member set in the lower compartment of the toilet box does not need to be a plate-shaped mat that is laid in a tray. The adjacent longitudinally extending ribs 17 do not need to be equal in height, and as the transversely extending ribs, the height of the longitudinally extending rib 17 may be different from that of at least one of adjacent longitudinally extending ribs.

Figures 6A, 6B:
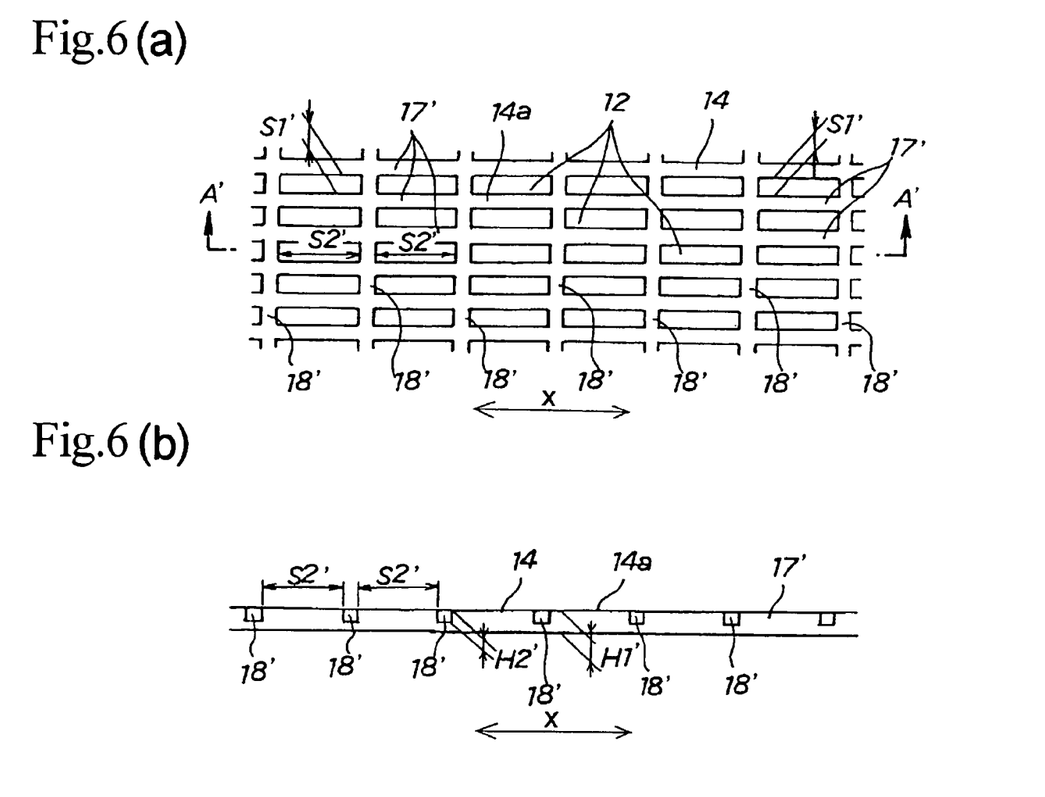
FIG. 6(a) is an enlarged, fragmentary plan of a drainboard in a pet toilet according to another embodiment of the present invention.
FIG. 6(b) is a cross-section taken along line A'-A' in FIG. 6(a).

A second preferred embodiment of the present invention provides a pet toilet 10' in which the almost rectangular, shallow tray 16 removably fitted below the drainboard 14 in the above-described first embodiment is a drawer slidable in the toilet box 13. As illustrated in FIGS. 6(a) and 6(b), the drainboard 14 in the second embodiment is an integral structure constructed of a plurality of longitudinally extending ribs 17' substantially equally spaced parallel with each other and a plurality of transversely extending ribs 18' intersecting the longitudinally extending ribs 17' and substantially equally spaced parallel with each other. The longitudinally extending ribs 17' extend in a direction making an angle within 45° with the moving direction X of the tray 16 as a drawer. In the particular example illustrated, the extending direction of the longitudinally extending ribs 17' coincides with the moving direction X. The drainboard 14 is configured so that the height of the longitudinally extending rib 17' with the largest height of all the longitudinally extending ribs 17' measured from the surface 14a of the drainboard 14 downward is larger than the height of any of the transversely extending ribs 18' disposed within an area where the drawer is movable. In the particular example illustrated, all the transversely extending ribs 18' have the same height H2', all the longitudinally extending ribs 17' have the same height H1', and the height H1' is larger than the height H2'. In the second embodiment, too, it is preferred that the height of the transversely extending rib 18' measured from the drainboard surface 14a downward be different from that of at least one of adjacent transversely extending ribs 18' so as to effectively prevent urine having passed through the excreta treating material 15 from forming a liquid bridge across the drain hole 12 of the drainboard 14 and thereby from staying there or from attaching to the lower side of the ribs 17' and 18'. It is also preferred for the same reasons that the height of the transversely extending rib 18' with the least height of all the transversely extending ribs 18' measured from the drainboard surface 14a downward is at least 0.8 times the transverse dimension of the drain hole 12 of the drainboard 14. The transverse dimension S1 of the drain hole 12 is preferably 2 to 8 mm, more preferably 3 to 5 mm. Within that range, the force drawing a liquid bridge along the longitudinal direction is strong to ensure an easy break of the liquid bridge, leaving no urine on the drainboard 14.

The difference between the height of the longitudinally extending ribs 17' and the height of the transversely extending ribs 18' both measured from the surface 14a of the drainboard 14 is preferably 0.1 to 10 mm, more preferably 0.3 to 5 mm, even more preferably 0.5 to 2 mm, to ensure a smooth slide of the tray 16.

The term "moving direction X" as used herein means the sliding direction of the tray 16 when pulled in and out of the toilet box 13 as a drawer. The extending direction of the longitudinally extending ribs should be 45° or smaller from the moving direction X, and is preferably 30° or smaller from the moving direction X. The transversely extending ribs 18' intersect with the longitudinally extending ribs 17', making an angle greater than 45° with the moving direction X, preferably an angle of 60° or greater with the moving direction X. The expression "area where the drawer is movable" means the part of the drainboard 14 where the tray 16 horizontally overlaps while pulling in and out when seen from above.

Figures 8A, 8B, 8C:
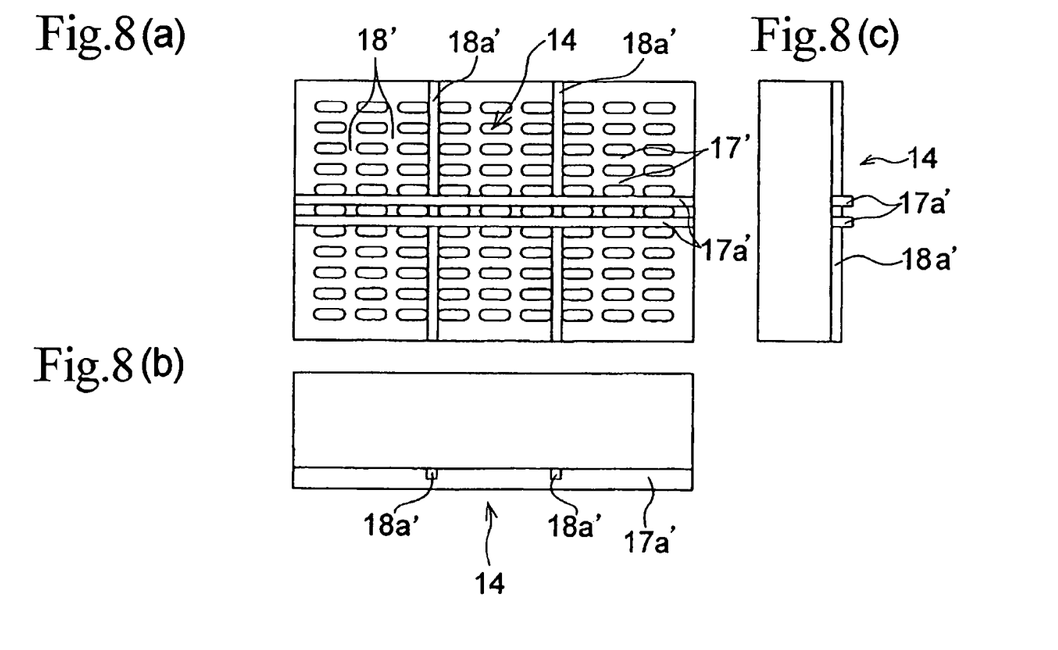
FIG. 8(a) is a bottom plan view of another drainboard.
FIG. 8(b) is an elevation view of another drainboard.
FIG. 8(c) is a right-side view of another drainboard.
Figure 9A:
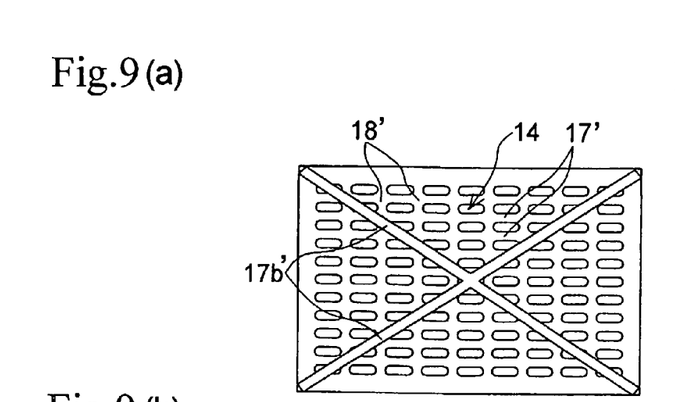
FIG. 9(a) is a bottom plan view of still another drainboard.
Figure 9B:
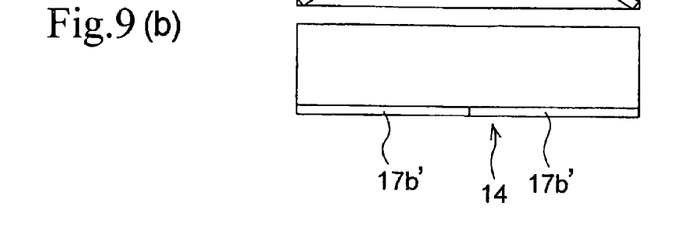
FIG. 9(b) is an elevation view of the still another drainboard.
Figure 9C:
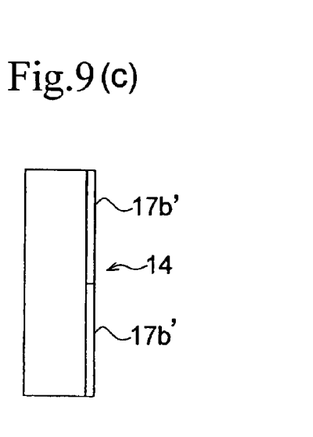
FIG. 9(c) is a right-side view of the still another drainboard.

It is only necessary that at least one of the longitudinally extending ribs 17' be designed to have a larger height than any of the transversely extending ribs 18'. Other ribs 17' may have a smaller height. FIGS. 8(a) to 8(c) can be referred to. In this case, the longitudinally extending rib 17' with the greatest height is preferably arranged as a longitudinally central rib 17a' in the central portion of the drainboard 14 where the sag is greatest so as to secure smooth movement of the tray 16. In the example illustrated in FIGS. 8(a) through 8(c), some of the transversely extending ribs 18' are higher downward than other ribs 18' to serve as crosswise reinforcing ribs 18a'. Furthermore, as illustrated in FIGS. 9(a) to 9(c), the drainboard 14 may have lengthwise reinforcing ribs 17b', which have a larger height than the transversely extending ribs 18' and are arranged within the recited angle range, in addition to the longitudinally extending ribs 17' defining the drain holes 12.

Figures 7A, 7B, 7C:
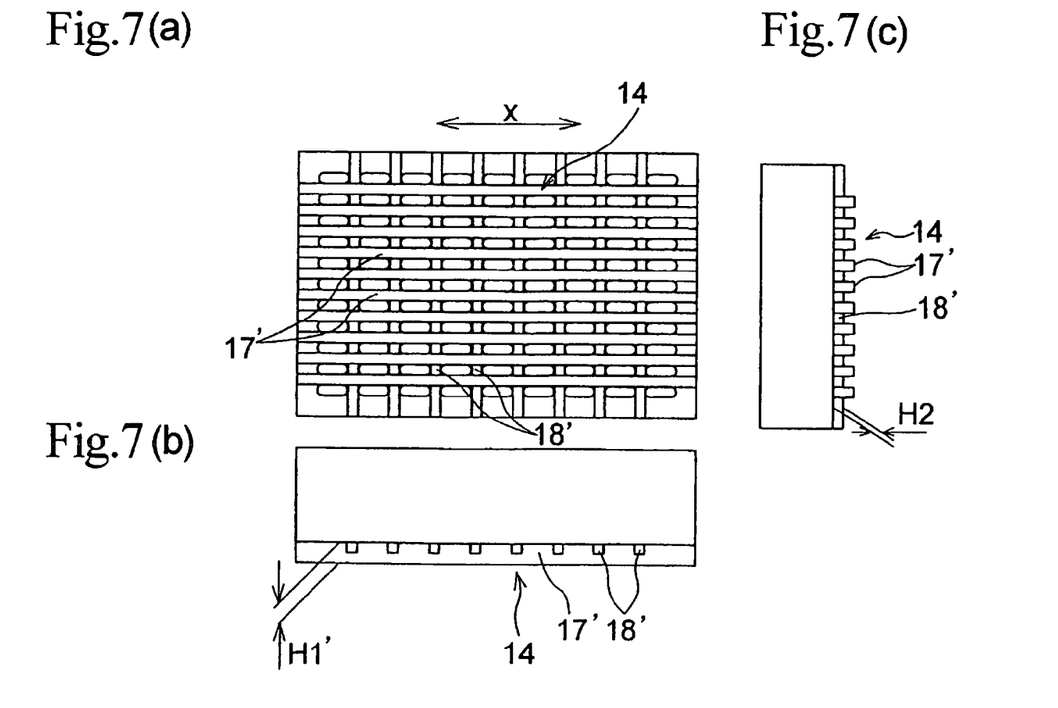
FIG. 7(a) is a bottom plan view of a drainboard in a pet toilet according to another embodiment of the present invention.
FIG. 7(b) is an elevation view of a drainboard in a pet toilet according to another embodiment of the present invention.
FIG. 7(c) is a right-side view of a drainboard in a pet toilet according to another embodiment of the present invention.

Irregularity on the lower side of the drainboard 14 due to the transversely extending ribs 18' intersecting with the moving direction X tends to interfere with the sliding movement of the top of the back wall 16a of the tray 16. The second embodiment providing the pet toilet 10' successfully avoids such interference, helping a user slide the tray 16 smoothly and replace the absorbent mat 11, a urine absorbent member, with ease. More specifically, as shown in FIGS. 7(a) to 7(c), the drainboard 14 used in the pet toilet 10' according to the second embodiment is an integral structure constructed of a plurality of longitudinally extending ribs 17' extending in the same direction as the moving direction X of the tray 16 and spaced parallel with each other and a plurality of transversely extending ribs 18' extending in a direction intersecting the direction of the longitudinally extending ribs 17' and spaced parallel with each other. The height of the longitudinally extending rib 17' with the largest height H1' of all the longitudinally extending ribs 17' measured from the surface 14a of the drainboard 14 downward is larger than the height of any of the transversely extending ribs 18' disposed within an area where the tray 16 is movable. According to this configuration, while the tray 16 is being pulled in and out in the tray housing 20 of the toilet box 13, the top of the back wall 16a of the tray 16 comes into contact with the longitudinally extending rib 17' with the larger downward height H1' over the whole distance of the sliding movement. A clearance is secured to avoid contact between the top of the back wall 16a of the tray 16 and the transversely extending ribs 18'. Therefore, the tray 16 can slide smoothly, with its back wall 16a being successfully kept away from the interference by the irregularity on the lower side of the drainboard 14 typically caused by the transversely extending ribs.

The present invention is not limited to the aforementioned second embodiment, and various changes and modifications can be made therein. The extending direction of the longitudinally extending ribs along the moving direction of the drawer does not always need to coincide with the longitudinal direction of the toilet box and may be oblique or orthogonal to the longitudinal direction of the toilet box. The urine absorbent member set in the lower compartment of the toilet box does not need to be a plate-shaped mat that is laid in the tray.

EXAMPLES

The present invention will now be illustrated in greater detail with reference to Examples and Comparative Examples, but it should be understood that the invention is not limited thereto.

Example 1

[Making of Drainboard]

Drainboards, the specifications of which (i.e., drain hole dimensions, height of longitudinally extending ribs, and heights of transversely extending higher and lower ribs) is shown in Table 1, were made. In the cases of using transversely extending ribs with different heights (lower and higher), they were arrayed alternately. Every rib had a width of 3 mm.

TABLE 1

| Drain Hole Dimensions (mm) | | | Height of Longitudinally Extending Rib (mm) | | | | | | | | | |
|---|---|---|---|---|---|---|---|---|---|---|---|---|
| | | | 2 | | | | 4 | 6 | | 8 | | |
| | | | Height of Transversely Extending Rib (mm) (lower/higher) | | | | | | | | | |
| | | | 2/2 | 2/2.5 | 2/4 | 2/6 | 4/4 | 6/6 | 8/8 | 7.5/8 | 6/8 | 4/8 |
| Transverse | Longitudinal | | Difference in Height of Transversely Extending Ribs (mm) | | | | | | | | | |
| | | | 0 | 0.5 | 2 | 4 | 0 | 0 | 0 | 0.5 | 2 | 4 |
| 5 | 5 | Incidence of Liquid Bridge (%) | 89 | 78 | 61 | 62 | 90 | 87 | 94 | 72 | 50 | 6.0 |
| | | Water Absorption by Litter (g) | 1.0 | 0.7 | 0.6 | 0.6 | 0.6 | 0.6 | 0.6 | 0.5 | 0.5 | 0.5 |
| | | Water Adhesion to Drainboard (g) | 0.4 | 0.3 | 0.1 | 0.1 | 0.6 | 0.5 | 0.6 | 0.4 | 0.4 | 0.1 |
| | | Height of Liquid Bridge (mm) | 1.8 | — | 1.9 | 2.0 | 4.0 | 6.0 | 7.9 | — | 5.9 | 3.9 |
| | 10 | Incidence of Liquid Bridge (%) | 67 | 53 | 40 | 0 | 66 | 62 | 60 | 53 | 20 | 0 |
| | | Water Absorption by Litter (g) | 0.8 | 0.6 | 0.6 | 0.4 | 0.6 | 0.5 | 0.6 | 0.3 | 0.3 | 0.3 |
| | | Water Adhesion to Drainboard (g) | 0.3 | 0.2 | 0.1 | 0.1 | 0.4 | 0.5 | 0.6 | 0.4 | 0.2 | 0.1 |
| | | Height of Liquid Bridge (mm) | 1.9 | — | 2.0 | 2.0 | 4.1 | 5.9 | 7.9 | — | 6.0 | 4.0 |
| | 15 | Incidence of Liquid Bridge (%) | 57 | 40 | 23 | 0 | 54 | 49 | 40 | 27 | 3 | 0 |
| | | Water Absorption by Litter(g) | 0.7 | 0.4 | 0.5 | 0.3 | 0.5 | 0.6 | 0.6 | 0.4 | 0.4 | 0.3 |
| | | Water Adsorption to Drainboard(g) | 0.3 | 0.2 | 0.1 | 0.1 | 0.5 | 0.5 | 0.3 | 0.2 | 0.1 | 0.1 |
| | | Height of Liquid Bridge (mm) | 1.9 | — | 2.0 | 2.0 | 4 | 5.9 | 7.9 | — | 6.0 | 4.0 |

TABLE 1-continued

| Drain Hole Dimensions (mm) | | | Height of Longitudinally Extending Rib (mm) | | | | | | | | |
|---|---|---|---|---|---|---|---|---|---|---|---|
| | | | 2 | | | | 4 | 6 | 8 | | |
| | | | Height of Transversely Extending Rib (mm) (lower/higher) | | | | | | | | |
| | | | 2/2 | 2/2.5 | 2/4 | 2/6 | 4/4 | 6/6 | 8/8 | 7.5/8 | 6/8 | 4/8 |
| Trans-verse | Longi-tudinal | | Difference in Height of Transversely Extending Ribs (mm) | | | | | | | | |
| | | | 0 | 0.5 | 2 | 4 | 0 | 0 | 0 | 0.5 | 2 | 4 |
| 3 | 10 | Incidence of Liquid Bridge (%) | 93 | 77 | 53 | 43 | 91 | 88 | 80 | 67 | 37 | 17 |
| | | Water Absorption by Litter (g) | 0.9 | 0.5 | 0.5 | 0.4 | 0.5 | 0.5 | 0.5 | 0.3 | 0.4 | 0.3 |
| | | Water Adhesion to Drainboard (g) | 0.6 | 0.4 | 0.2 | 0.1 | 0.7 | 0.6 | 0.5 | 0.4 | 0.2 | 0.1 |
| | | Height of Liquid Bridge (mm) | 1.9 | — | 2.0 | 2.1 | 4 | 5.9 | 7.9 | — | 6.0 | 3.8 |
| | 15 | Incidence of Liquid Bridge (%) | 60 | 50 | 37 | 17 | 55 | 62 | 57 | 50 | 13 | 0 |
| | | Water Absorption by Litter (g) | 0.8 | 0.4 | 0.4 | 0.4 | 0.4 | 0.5 | 0.5 | 0.4 | 0.4 | 0.3 |
| | | Water Adhesion to Drainboard (g) | 0.5 | 0.3 | 0.1 | 0.1 | 0.5 | 0.6 | 0.6 | 0.3 | 0.1 | 0.1 |
| | | Height of Liquid Bridge (mm) | 1.8 | — | 1.9 | 2.1 | 4 | 5.9 | 7.9 | — | 5.9 | 3.9 |
| | 30 | Incidence of Liquid Bridge (mm) | 33 | 7.0 | 0 | 0 | 39 | 41 | 40 | 10 | 3.0 | 0 |
| | | Water Absorption by Litter (g) | 0.8 | 0.4 | 0.3 | 0.3 | 0.3 | 0.3 | 0.3 | 0.3 | 0.3 | 0.3 |
| | | Water Adhesion to Drainboard (g) | 0.4 | 0.3 | 0.1 | 0.1 | 0.4 | 0.4 | 0.5 | 0.3 | 0.1 | 0.1 |
| | | Height of Liquid Bridge (mm) | 1.9 | — | 2.0 | 2.0 | 4 | 5.9 | 7.8 | — | 5.9 | 4.0 |

[Incidence of Liquid Bridge]

Each of the drainboards prepared was cut to a 150 mm side square piece. The cut piece was immersed in a tank filled with an ion exchanged water at 25°, pulled up at a speed of 10 mm/sec, and left to stand still for 5 seconds after taking out of the water. The number of the drain holes over which a liquid bridge was formed out of ten drain holes in the central part of the cut piece was counted. The test was repeated ten times in total to obtain an average incidence of liquid bridge formation.

[Height of Liquid Bridge]

In measuring the incidence of liquid bridge formation as described above, the distance from the upper surface of the drainboard to the liquid bridge was measured with a micrometer caliper.

[Water Absorption by Litter and Water Adhesion to Drainboard]

A cylinder of 70 mm×70 mm in cross-section and 20 mm in height was placed on each of the drainboards prepared, and about 70 g of litter as an excreta treating material was put into the cylinder. Twenty grams of ion exchanged water at 25° C. was dropped into the cylinder at a rate of 1 g/sec. Five minutes after completion of the dropping, the litter and the drainboard were weighed to calculate the amount of water absorbed by the litter and the amount of water adhered to the drainboard, respectively. As the litter, commercially available woody pellets having a water absorption rate of 4.3% (available from Kao Corp. under the trade name "Nyantomo Seiketsu Toire Sarasarano Chippu"; diameter: 6.0 mm; average length: 11 mm) were used.

As is seen from the results in Table 1, when in using a drainboard having drain holes whose longitudinal dimension is twice or more as long as the transverse dimension thereof and having a difference in height between neighboring, transversely extending ribs, the incidence of liquid bridge formation over the individual drain holes is low, and adhesion of water to the drainboard is small. In contrast, when either one of or both of these configurational conditions is/are not fulfilled, the incidence of liquid bridge formation over the drain holes is high, and adhesion of water to the drainboard is large.

In the case where the height of the longitudinally extending ribs of the drainboard is 0.8 or more times the transverse dimension of the drain holes, water absorption by the litter can be reduced even when water adheres to the drainboard and the incidence of liquid bridge formation is high.

In the case where the longitudinal dimension of the drain holes is twice or more times the transverse dimension of the drain holes, the neighboring, transversely extending ribs are different in height, and the height of the longitudinally extending ribs of the drainboard is 0.8 or more times the transverse dimension of the drain holes, both the water adhesion to the drainboard and the water absorption by the litter are on low levels.

From these results, the pet toilet using a drainboard satisfying the constitutional requirements of the present invention proves effective in suppressing generation of odors from urine because adhesion of urine to the drainboard can be reduced so that the litter hardly absorbs urine.

Examples 2 and 3 and Comparative Examples 1 and 2

Figure 10:
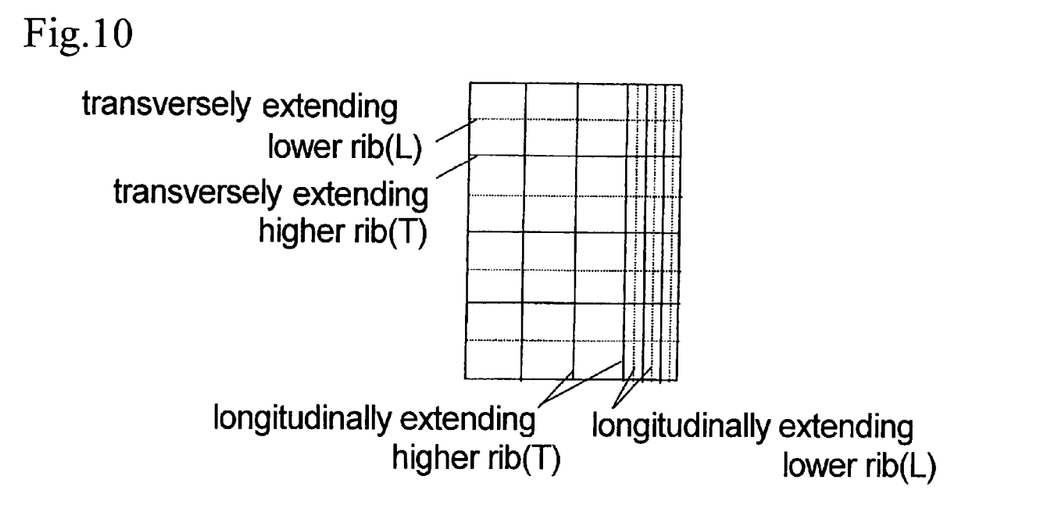
FIG. 10 illustrates arrangement of longitudinally extending ribs and transversely extending ribs in the drainboards of Examples and Comparative Examples.

Drainboards having drain holes whose dimensions S1' and S2' (see FIG. 6) were 3 mm and 30 mm, respectively, and having longitudinally extending ribs and transversely extending ribs whose heights are shown in Table 2 were made. The arrangement of the longitudinally extending ribs and the transversely extending ribs was as illustrated in FIG. 10. In the cases where longitudinally extending ribs had two heights (longitudinally extending, lower ribs (L) and longitudinally extending, higher ribs (T)), the height of the lower ribs L was equal to that of transversely extending, lower ribs (L). In the cases of using longitudinally extending, lower and higher ribs and/or transversely extending, lower and higher ribs, the lower ones and the higher ones were arrayed alternately. All the ribs had a width of 3 mm.

Ease of Drawer Movement

An excreta treatment material (litter) of the amount shown in Table 2 was put on each drainboard of Examples 2 and 3 and Comparative Examples 1 and 2. The strain developed with time and the force required to pull out the drawer were measured. The results obtained are shown in Table 2.

TABLE 2

|  |  | Comp. Example 1 | Comp. Example 2 | Example 2 | Example 3 |
|---|---|---|---|---|---|
| Drainboard Size (mm) | Length | 390 | 390 | 390 | 390 |
|  | Width | 290 | 290 | 290 | 290 |
| Height of Transversely Extending Ribs (mm) | L | 3 | 3 | 3 | 3 |
|  | T | 6 | 6 | 6 | 3 |
| Height of Longitudinally Extending Ribs (mm) | L | 3 | 3 | 3 | 3 |
|  | T | 3 | 6 | 6.1 | 6 |
| Stress/Strain in Central Part (N/10 mm) |  | 30.7 | 31.2 | 32.3 | 29.1 |
| Clearance between Drainboard and Drawer's Side Wall (mm) |  | 5 | 5 | 5 | 5 |
| Vertical Strain (litter: 2 Kg; 40° C.) (mm) |  | 8.2 | 8.1 | 8.1 | 8.3 |
| Drawing Force (N) | Before Plastic Deformation | 1.3 | 1.4 | 1.3 | 1.5 |
|  | After Plastic Deformation | 9.1 | 5.9 | 3.8 | 3.1 |

It is seen from the results shown in Table 2 that, when the downward height of the longitudinally extending ribs is larger than the downward height of the transversely extending ribs by 0.1 mm or more, the drawer is smoothly moved without needing so much force even when the drainboard is largely deformed.

INDUSTRIAL APPLICABILITY

By use of the pet toilet system of the present invention, it is possible to effectively prevent urine having passed through an excreta treating material from staying on a drainboard having a large number of drain holes, which are formed by the intersection between longitudinally extending ribs and transversely extending ribs, on account of urine bridge formation over the drain holes or urine adhesion to the lower side of the ribs.

By use of the pet toilet system of the present invention having a drainboard, which is formed by the intersection between longitudinally extending ribs and transversely extending ribs, and a drawer containing a urine absorbent member below the drainboard, interference of the irregularity on the lower side of the drainboard with the top of the wall of the drawer can effectively be avoided. The drawer can thus be pulled in and out smoothly, making it easy to replace the urine absorbent member.

The invention claimed is:

1. A pet toilet comprising a toilet box, a drainboard partitioning the toilet box into an upper compartment and a lower compartment, an excreta treating material laid in the upper compartment, and an urine absorbent member laid in the lower compartment,
   the drainboard being integrally constructed of a plurality of longitudinally extending ribs spaced parallel with each other and a plurality of transversely extending ribs intersecting the longitudinally extending ribs and spaced parallel with each other to have drain holes,
   each drain hole having a longitudinal dimension at least twice the transverse dimension thereof, and
   the height of the transversely extending rib measured from the upper surface of the drainboard downward being different from that of at least one of adjacent transversely extending ribs.

2. The pet toilet according to claim 1, wherein the height of the rib with the least height of all the ribs measured from the surface of the drainboard downward being at least 0.8 times the transverse dimension of the drain hole.

3. The pet toilet according to any one of claims 1 to 2, wherein the transverse dimension of the drain hole is 2 to 8 mm.

4. A pet toilet comprising a toilet box, a drainboard partitioning the toilet box into an upper compartment and a lower compartment, a water-repellent excreta treating material laid in the upper compartment, and an urine absorbent member laid in the lower compartment,
   the drainboard being integrally constructed of a plurality of longitudinally extending ribs spaced parallel with each other and a plurality of transversely extending ribs intersecting the longitudinally extending ribs and spaced parallel with each other to have drain holes,
   each drain hole having a longitudinal dimension at least twice the transverse dimension thereof, and
   the height of the rib with the least height of all the ribs measured from the surface of the drainboard downward being at least 0.8 times the transverse dimension of the drain hole.

5. A pet toilet comprising a toilet box, a drainboard partitioning the toilet box into an upper compartment and a lower compartment, an excreta treating material laid in the upper compartment, and an urine absorbent member laid in the lower compartment,
   the lower compartment containing the urine absorbent member having a drawer slidably removable in one direction from the lower compartment,
   the drainboard being integrally constructed of a plurality of longitudinally extending ribs extending in a direction making an angle within 45° with the sliding direction of the drawer and spaced parallel with each other and a plurality of transversely extending ribs intersecting the longitudinally extending ribs and spaced parallel with each other, and
   the height of the longitudinally extending rib with the largest height of all the longitudinally extending ribs measured from the surface of the drainboard downward being larger than the height of any transversely extending rib disposed within an area where the drawer is movable.

6. The pet toilet according to claim 5, wherein the longitudinally extending ribs extend in a direction making an angle within 30° with the sliding direction of the drawer.

7. The pet toilet according to claim 5, wherein the height of the rib with the least height of all the ribs measured from the surface of the drainboard downward is at least 0.8 times the transverse dimension of the drain hole.

8. The pet toilet according to claim 5, wherein the transverse dimension of the drain hole is 2 to 8 mm.

9. The pet toilet according to claim 5, wherein the downward height of the longitudinally extending ribs is larger than the downward height of the transversely extending ribs by 0.1 mm or more.

* * * * *